(12) United States Patent
Baba

(10) Patent No.: US 7,304,755 B2
(45) Date of Patent: Dec. 4, 2007

(54) FACSIMILE APPARATUS, A METHOD OF DISPLAYING ADVERTISEMENT INFORMATION THROUGH THE FACSIMILE APPARATUS AND A COMMUNICATION SYSTEM PROVIDED WITH THE FACSIMILE APPARATUS

(75) Inventor: Keizo Baba, Atsugi (JP)

(73) Assignee: Ricoh Company, Ltd., Tokyo (JP)

( * ) Notice: Subject to any disclaimer, the term of this patent is extended or adjusted under 35 U.S.C. 154(b) by 887 days.

(21) Appl. No.: 09/808,932

(22) Filed: Mar. 15, 2001

(65) Prior Publication Data

US 2001/0022669 A1   Sep. 20, 2001

(30) Foreign Application Priority Data

Mar. 15, 2000   (JP)   ............................. 2000-072654
Feb. 16, 2001   (JP)   ............................. 2001-040422

(51) Int. Cl.
  *G06F 3/12*   (2006.01)
  *G06K 15/00*   (2006.01)
  *G06Q 30/00*   (2006.01)

(52) U.S. Cl. .................. 358/1.15; 358/1.16; 358/1.13; 705/14

(58) Field of Classification Search ............... 358/1.15, 358/1.16, 400, 426.12, 442, 468; 379/100.01, 379/93.17, 114.13; 283/56; 705/14; 709/246, 709/217
See application file for complete search history.

(56) References Cited

U.S. PATENT DOCUMENTS

| 4,922,524 | A | | 5/1990 | Baba | |
|---|---|---|---|---|---|
| 5,508,824 | A | | 4/1996 | Baba | |
| 5,513,254 | A | * | 4/1996 | Markowitz | ............. 379/100.17 |
| 5,701,497 | A | * | 12/1997 | Yamauchi et al. | ............. 704/3 |
| 5,781,894 | A | * | 7/1998 | Petrecca et al. | ............. 705/14 |
| 5,875,422 | A | * | 2/1999 | Eslambolchi et al. | .......... 704/3 |
| 5,884,246 | A | * | 3/1999 | Boucher et al. | ............... 704/2 |
| 5,884,296 | A | * | 3/1999 | Nakamura et al. | ............ 706/20 |
| 5,946,108 | A | | 8/1999 | Baba | |
| 6,057,945 | A | | 5/2000 | Baba | |
| 6,601,037 | B1 | * | 7/2003 | Kolls | ........................ 705/14 |
| 6,622,174 | B1 | * | 9/2003 | Ukita et al. | ................. 709/246 |
| 6,785,711 | B1 | * | 8/2004 | Motoyama et al. | ......... 709/206 |

(Continued)

FOREIGN PATENT DOCUMENTS

JP   1-195753   8/1989

(Continued)

OTHER PUBLICATIONS

U.S. Appl. No. 09/448,855, filed Nov. 24, 1999.

(Continued)

*Primary Examiner*—David Moore
*Assistant Examiner*—Thomas J. Lett
(74) *Attorney, Agent, or Firm*—Cooper & Dunham, LLP

(57) ABSTRACT

A facsimile apparatus includes a network interface device connected to a network and capable of transmitting and receiving facsimile data therebetween; an advertisement information acquiring device for acquiring advertisement information from an advertisement server connected to the network via the network interface device; a displaying device for displaying the advertisement information acquired from the advertisement information acquiring device; and a displaying control device for controlling the displaying of the advertisement information.

63 Claims, 14 Drawing Sheets

U.S. PATENT DOCUMENTS

| | | | |
|---|---|---|---|
| 7,068,385 B2 * | 6/2006 | Kohli | 358/1.15 |
| 2003/0123622 A1 * | 7/2003 | Gifford et al. | 379/88.13 |

FOREIGN PATENT DOCUMENTS

| | | |
|---|---|---|
| JP | 1-263690 | 10/1989 |
| JP | 6-13258 | 2/1994 |
| JP | 9-91215 | 4/1997 |
| JP | 9-91358 | 4/1997 |
| JP | 11-68987 | 3/1999 |
| JP | 11-275134 | 10/1999 |
| JP | 2000-59554 | 2/2000 |
| JP | 2001326771 A * | 11/2001 |
| WO | WO 9624213 A1 * | 8/1996 |

OTHER PUBLICATIONS

U.S. Appl. No. 09/358,971, filed Jul. 16, 1999.

* cited by examiner

FIG. 6
COMMUNICATION CONTROL REPORT
99/11/01  10:20  1234                                    OK
..
..
..
..
..
..
..
..
..
..
..
 : ADVERTISEMENT INFORMATION ND DISPLAYING ADVERTISEMENT INFORMATION THROUGH THE FACSIMILE APPARATUS AND A COMMUNICATION SYSTEM PROVIDED WITH THE FACSIMILE APPARATUS

BACKGROUND

1. Field

This patent specification relates to a facsimile apparatus, and in particular relates to a facsimile apparatus connected to a network and capable of transmitting and receiving image data via the network.

2. Discussion

More recent facsimile machines often have a network interface to connect to a network. Some can be connected to the Internet such that facsimile image data can be transmitted and received via the Internet, and are called "Internet facsimile" machines.

The Internet has rapidly become more popular and more widely used for exchange of information such as electronic mailing and news broadcasting. Also, the Internet has created new industries such as on-line shopping, electronic money, etc.

Internet facsimile machine have not yet become so widespread, perhaps in part because of the cost of the network interface and because they are typically limited to using the Internet only for transferring or transmitting facsimile image data.

SUMMARY

This patent specification describes advances made in view of the above-discussed and other problems.

Accordingly, preferred embodiments provide an Internet facsimile apparatus and a method of displaying advertisement information at a display of the facsimile apparatus.

According to a preferred embodiment, a facsimile apparatus includes a network interface device connected to a network and capable of transmitting and receiving facsimile data; an advertisement information acquiring device for acquiring advertisement information from an advertisement server connected to the network via the network interface device; a displaying device for displaying the advertisement information acquired from the advertisement information acquiring device; and a displaying control device for controlling the displaying of the advertisement information.

In the above-described facsimile apparatus, the displaying control device may be configured to display the advertisement information during a time period of transmitting facsimile data.

Further, the displaying control device may display the advertisement information at the display device during a time period of storing facsimile data in memory.

The facsimile apparatus may further include an output device and an advertisement information output instructing device for instructing the outputting of the advertisement information being displayed on the display device, and the displaying control device may be configured to output the advertisement information, with the outputting device, as instructed by the advertisement information output instructing device.

The facsimile apparatus may further include an advertisement information facsimile transmission instructing device for instructing the facsimile transmission of advertisement information being displayed on the display device, and the displaying control device may be configured to transmit by facsimile transmission the advertisement information as instructed by the advertisement information facsimile transmission instructing device to a previously set address.

The facsimile apparatus may further include an advertisement information mail transmission instructing device for instructing the electronic mail transmission of the advertisement information being displayed on the display device, and the displaying control device may be configured to transmit by electronic mail the advertisement information as instructed by the advertisement information mail transmission instructing device to a previously set address.

Further, in the facsimile apparatus the displaying control device may be configured to combine advertisement information with a communication control report into a composited image.

Furthermore, the displaying control device may combine advertisement information with transmission image data into a composited image.

Further, in the facsimile apparatus, the displaying control device may output the advertisement information to the outputting device at preset or otherwise determined times, e.g., at constant time intervals.

Furthermore, the displaying control device may transmit the advertisement information by electronic mail to a previously set address at preset or otherwise determined times, e.g., at constant time intervals.

Further, the displaying control device may specify a transmission destination country from a telephone number of a facsimile transmission address, and the displaying control device may combine the advertisement information of a language of the specified country with a part of transmission image data into a composited image.

The indication control device may alternatively specify a communication destination country from an electronic mail address of an electronic mail transmission, and the displaying control device may transmit the advertisement information in a language employed in the specified country.

Further, in the facsimile apparatus the advertisement information acquiring device may be configured to acquire the advertisement information from the advertisement server at a constant time interval.

According to another preferred embodiment, a method of displaying advertisement information in a facsimile apparatus includes the steps of acquiring advertisement information from an advertisement server connected to a network through the network, and displaying the advertisement information thus acquired at a display device of the facsimile apparatus.

In the method, the step of displaying the acquired advertisement information may include the steps of displaying the acquired advertisement information at the display device at a time of starting facsimile transmission, and ending the displaying of the advertisement information at the display device at a time of ending the facsimile transmission.

Alternatively, the step of displaying the acquired advertisement information may include the steps of displaying the acquired advertisement information at a time of starting the storing of facsimile data for transmission in a storage device, and ending the displaying of the advertisement information on the display device at a time of ending the storing of the facsimile data in the storage device.

The method may further include the step of outputting the advertisement information in accordance with an instruction for outputting the advertisement information being displayed at the display device.

Further, the method may include the step of transmitting by facsimile transmission the advertisement information in accordance with an instruction for transmitting by facsimile transmission the advertisement information being displayed at the display device.

The method may alternatively include the step of transmitting by electronic mail the advertisement information in accordance with an instruction for transmitting by electronic mail the advertisement information being displayed at the display device.

Further, the method may include the step of combining the advertisement information with a communication control report into a composited image.

Furthermore, the method may include the step of composing the advertisement information with a part of transmission image data.

Further, the method may include the step of outputting the advertisement information to an outputting device of the facsimile device at constant time intervals.

Furthermore, the method may include the step of transmitting the advertisement information by electronic mail to a previously set address at contact time intervals.

The method may further include the step of specifying a transmission destination country from a telephone number of a facsimile transmission address, and the advertisement information in a language of the specified country may be combined with transmission image data into a composited image.

Further, the method may include the step of specifying a transmission destination from an electronic mail address of an electronic mail transmission, and transmitting as electronic mail the advertisement information in a language employed in the specified country.

Furthermore, in the method, the advertisement information may be acquired from the advertisement server at constant time intervals.

According to another embodiment, a communication system includes a network connecting plural terminal devices with transmission paths and transmitting and receiving data between the plural terminal devices through the transmission paths, an advertisement server connected to the network, and a facsimile apparatus including a network interface device connected to the network and capable of transmitting and receiving facsimile data, an advertisement information acquiring device for acquiring advertisement information from the advertisement server through the network interface device, a display device for displaying the advertisement information acquired by the advertisement information acquiring device, and a displaying control device for controlling the displaying of the advertisement information.

BRIEF DESCRIPTION OF THE DRAWINGS

A more complete appreciation of the disclosed system and method and many of the attendant advantages thereof will be readily obtained as the same becomes better understood by reference to the following detailed description when considered in connection with the accompanying drawings, wherein:

FIG. 6 is a diagram illustrating an example of composing the advertisement information with the communication control report;

DETAILED DESCRIPTION OF PREFERRED EMBODIMENTS

Figure 1:
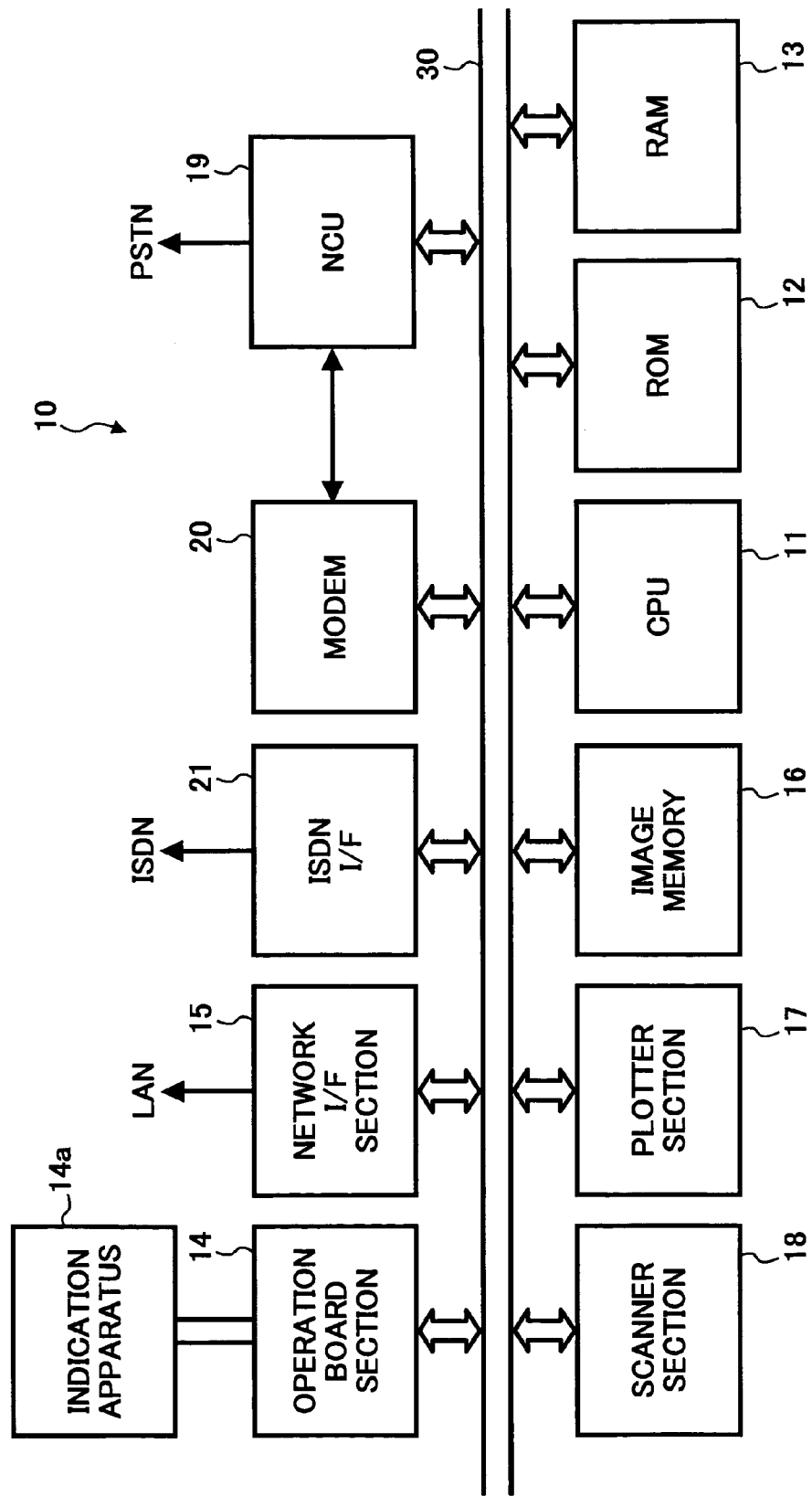
FIG. 1 is a block diagram illustrating an Internet facsimile apparatus according to a preferred embodiment.

In describing preferred embodiment illustrated in the accompanying drawings, specific terminology is employed for the sake of clarity. However, the disclosure is not intended to be limited to the specific terminology so selected and it is to be understood that each specific element includes all technical equivalents which operate in a similar manner.

Referring now to the accompanying drawings; wherein like reference numerals designate identical or corresponding parts throughout the several views or diagrams, and more particularly to FIGS. 1 through 9, there is illustrated an Internet facsimile apparatus and a method of displaying advertisement information.

In FIG. 1, a facsimile apparatus 10 is connected, through a bus 30, to a CPU (Central Processing Unit) 11, a ROM (Read Only Memory) 12, a RAM (Random Access Memory) 13, an operation board section 14, a network interface section 15, an image memory 16, a plotter section 17, a scanner section 18, an NCU (Network Control Unit) section 19, a MODEM 20, and an ISDN (Integrated Services Digital Network) interface section 21.

The CPU 11 controls the respective sections of the apparatus in accordance with the program stored in the ROM 12 to carry out the various predetermined operations of the facsimile apparatus.

The RAM 13 stores various types of information such as the drive condition of the respective sections in the apparatus, control data, etc., and further stores data necessary for the operation of the facsimile apparatus.

The operation board section 14 is provided with a display device 14a for displaying states of the apparatus and operation guidance therefor, and has keys for controlling various operations of the facsimile apparatus and LED (Light-Emitting Diode) indicators. The display device 14a can display a bit-mapped image.

The network interface section 15 is connected to a local area network (hereinafter, called "LAN"), and communicates with servers, etc. accessible through the LAN. Furthermore, the network interface section 15 is connected to the Internet through such servers and performs the operation of transmitting and receiving electronic mail.

The image memory 16 accumulates image data read out by the scanner section 18 and image data received by the network control section 19.

The plotter section 17 includes a charging section, a developing section, a fixing section, a photosensitive body, and a paper feeding section, and records image data on a recording paper.

The scanner section 18 reads out the image on an original document to be transmitted, and converts the read-out image to image data.

The network control section 19 is connected to a PSTN (Public Switched Telephone Network), and predetermined transmitting and receiving operations are performed by establishing a connection to the network, sending out a selection signal such as the sender's telephone number, and detecting a call arrival.

The MODEM 20 modulates and demodulates image data, and the image data thus modulated and/or demodulated is transmitted through the network control section 19. Various procedure signals in a transmission control procedure are also transmitted therethrough.

The ISDN interface section 21 is connected to the ISDN, and performs predetermined transmitting and receiving operations by sending out a call setting message, and by receiving a call setting message, etc.

Figure 2:
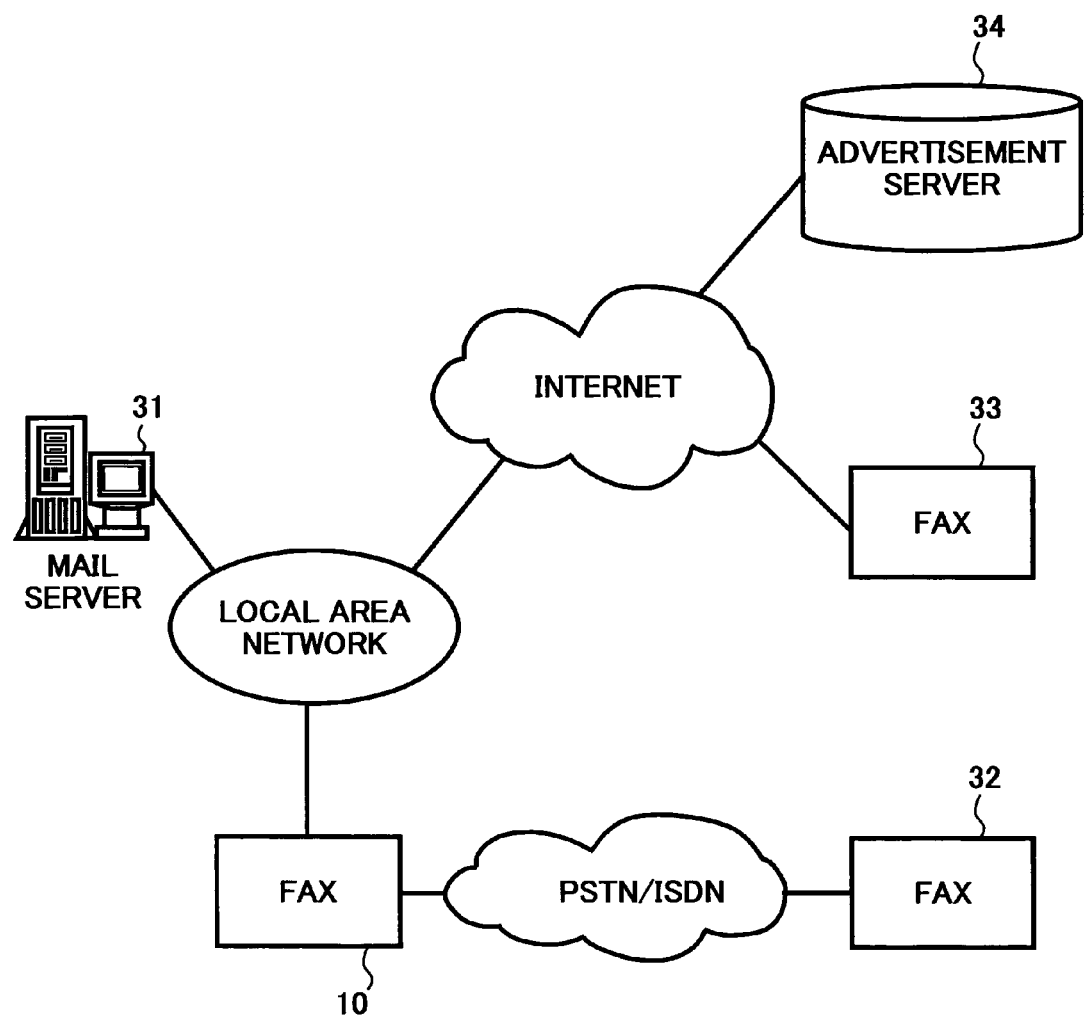
FIG. 2 is a diagram illustrating a system using the Internet facsimile apparatus of FIG. 1.

As illustrated in FIG. 2, the facsimile apparatus 10 is connected to the PSTN (Public Switched Telephone Network) or the ISDN (Integrated Services Digital Network). Therefore, it is possible to perform facsimile communication with the facsimile apparatus 32 connected to the PSTN or the ISDN by use of the G3 or G4 protocol. Furthermore, it is also possible to connect the facsimile apparatus to the Internet by communicating with an Internet server (not shown) on the LAN through the network interface section 15, and electronic mail can be transmitted and received by use of the mail server 31 on the LAN.

Thus, the contents of a facsimile original document can be transmitted to the other Internet facsimile apparatus 33 connected to the Internet.

An advertisement server 34 serving as a data server for advertisement information is provided on the Internet. Advertisement information is accumulated (stored) in the advertisement server 34, and advertisement information such as image information of an advertisement can be acquired therefrom by use of the FTP (File Transfer Protocol) or electronic mail.

The Internet facsimile apparatus 10 acquires advertisement information from the advertisement server 34 on the Internet and displays the advertisement information thus acquired at the display device 14a during the time period of a facsimile transmission process.

Figure 3:
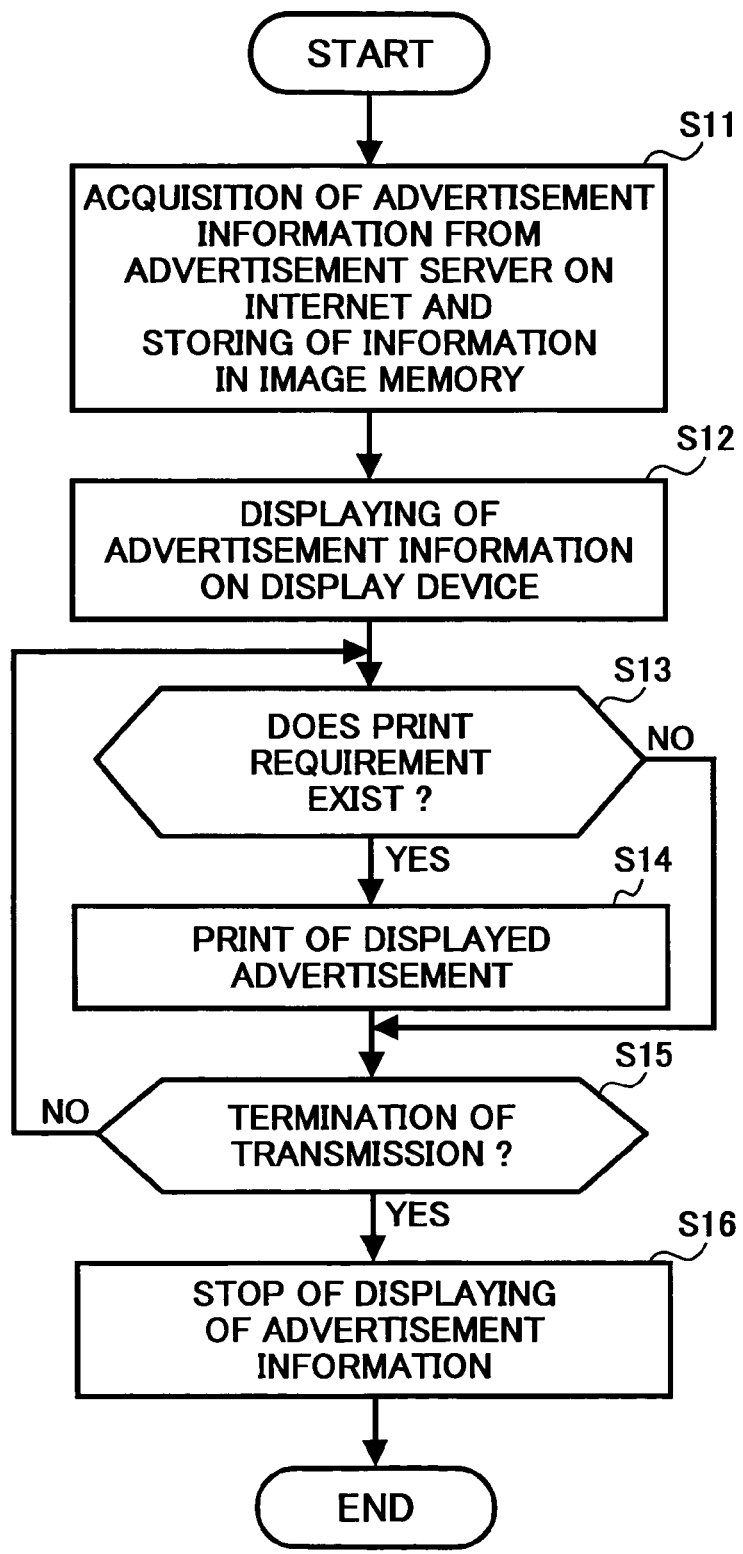
FIG. 3 is a flowchart illustrating a process of displaying advertisement information at the time of facsimile transmission.

As a particular example, as illustrated in the flowchart of FIG. 3, the CPU11 detects the state of setting an original document on the scanner portion 18, and the address to be transmitted is inputted therein (in the CPU11) by pushing keys of the operation board section 14. When the transmission key is pushed and a transmission process is commanded at a facsimile apparatus such as 10, advertisement information is acquired from the advertisement server 34 on the Internet through the network interface section 15 and the advertisement information thus acquired is accumulated (stored) in the image memory 16 (S11), and is displayed at the display device 14a of the operation board section 14 (S12).

Here, regarding the method of displaying advertisement information on the display device 14a, it may be allowable to display the advertisement information on the entire display area of the display device 14a. Or otherwise, it may be also allowable to display the advertisement information on a part of the display area of the display device 14a and display the other different matter (for instance, information relating to the addressed communication partner, transmission time, etc.) on the remaining part of the display area other than the part of the display device 14a where the advertisement information is displayed.

During the displaying operation, the CPU11 determines whether a command to print the advertisement information has been entered by pushing a key on the operation board section 14 (S13). When such printing requirement exists, the advertisement information stored in the image memory 16 and being displayed is printed and outputted by the plotter section 17. When no printing requirement exists, the following process is performed.

Next, the process determines whether the transmission process is finished (S15). If the process is not finished, the process returns to the step 13 and the indicated steps are repeated.

When the transmission process is finished, the CPU11 ends the displaying of the advertisement information (S16) and finishes the process. Thus, the CPU11 and associated components function as an advertisement information acquisition device, and the network interface section 15 and associated devices function as a network interface device in this example.

The operation board section 14 and associated components function as an advertisement information output instructing device and the plotter section 17 and associated components function as an output device.

As described above, according to a preferred embodiment, when a process of facsimile transmission starts, advertisement information is displayed at the display device 14a of the operation board section 14. If the user is watching the display device 14a of the operation board section 14 while waiting for the facsimile transmission to end, as is often the case, the user can be expected to see the displayed advertisement information. Therefore, the Internet facsimile apparatus can be effectively utilized as an advertisement medium.

Furthermore, in the present embodiment, since the advertisement information being displayed on the display device 14a is printed and outputted by operating the keys of the operation board section 14, advertisement information selected by the user can be printed out. Thus, the Internet facsimile apparatus can be effectively utilized as the advertisement medium.

In the above-described embodiment, when the transmission key of the operation board section 14 is pressed and thereby a transmission process is commanded, advertisement information is acquired and accumulated (stored), and the advertisement information is displayed on the display device 14a. However, the disclosed system is not limited to the above. For instance, if a transmission process is commanded, advertisement information that has been already accumulated can be displayed, and new advertisement information can be acquired after the transmission process ends. Furthermore, if new advertisement information cannot be acquired within a predetermined time period as determined by a timer, advertisement information that has been previously accumulated can be displayed and the transmission process can proceed without delay, as a priority.

Furthermore, when setting of the scanner section is detected, acquisition of advertisement information is started, and if the advertisement information can be acquired before a transmission process starts in response to pushing down the transmission key of the operation board section 14, the acquired advertisement information can be displayed, and if the advertisement information could not be acquired by that time, advertisement information that has been previously accumulated can be displayed and the transmission process can start without delay, as a priority.

In the present embodiment, although advertisement information is displayed at the display device 14a during the time period of performing a transmission process, the embodiment is not limited to the above. The advertisement information can be displayed when the user is likely to be at the apparatus even if it is not necessary to display operation guidance at the display device 14a. For instance, the advertisement information can be displayed at the time of receiving a polling transmission.

Furthermore, an operator sensor may be provided, so that whether the operator simply is at or near the apparatus, as detected by the operation sensor, the advertisement information can be displayed at the display device 14a, even if there is no need otherwise to display operational guidance information. Furthermore, when the operator is at or near the apparatus and when it is necessary to display operational guidance, advertisement information can be displayed at a part of the display device 14a, and the operational guidance can be displayed at the remaining part. Thus, in the above-described structure, when the operator is at or near the apparatus, advertisement information can be displayed, whereby the facsimile apparatus can be effectively utilized as an advertisement medium.

Further, the facsimile apparatus 10 can display the acquired advertisement information at the display device 14a while storing image data of an original document in a memory for later transmission.

Figure 4:
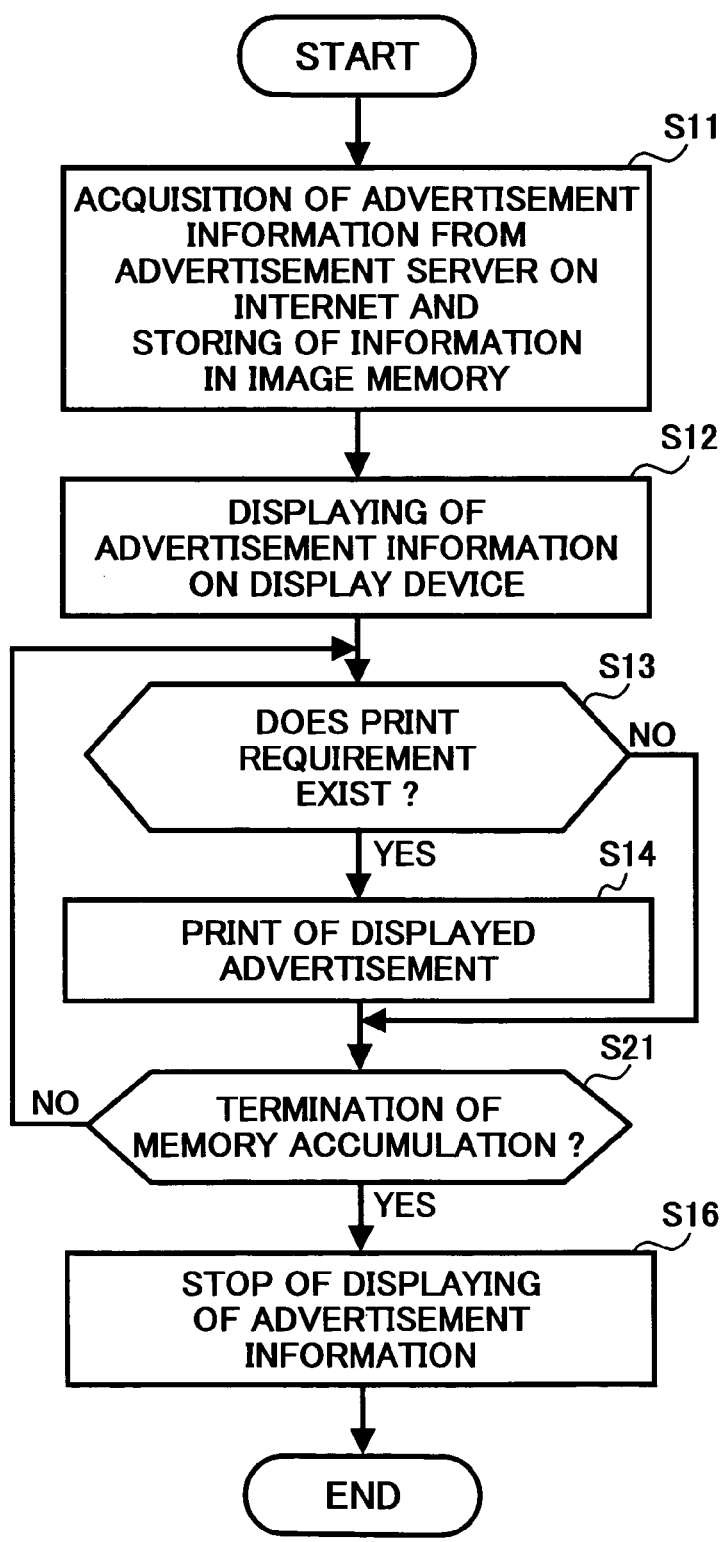
FIG. 4 is a flowchart illustrating a process of displaying advertisement information at the time of accumulating facsimile data in a memory.

As illustrated in the flowchart of FIG. 4, the CPU11 detects setting of an original document in the scanner section 18, and an address is inputted by operating the keys of the operation board section 14. When a memory accumulation key is pushed and thereby a process of storing image data of the original document (memory accumulation) starts, as illustrated in FIG. 3 the CPU11 acquires advertisement information from the advertisement server 34 on the Internet and displays the advertisement information at the display device 14a (S11-S12). When a print request is inputted during the displaying of the advertisement information, the advertisement information being displayed is printed and outputted by the plotter section 17 (S13-S14). Thereafter, whether the memory accumulation (storing) is finished is determined (S21). If the storage in memory is not finished, the processes returns to step 13.

When the process of storing in memory is finished, the displaying of the advertisement information is stopped (S16), and the process ends.

Thus, in the present embodiment when a process of memory accumulation (storing) starts, advertisement information is displayed at the display device 14a of the operation board section 14. Because the user often or typically watches the display device 14a of the operation board section 14 during while waiting for storage in memory to end, the user can be expected to see the displayed advertisement information. Therefore, the Internet facsimile apparatus can be effectively utilized as an advertisement medium.

In the above-described embodiment, when the memory accumulating key of the operation board section 14 is pushed down and the memory accumulation process starts, advertisement information is acquired and accumulated, and displayed at the display device 14a. However, the disclosed system is not limited to the above-described embodiment. For instance, when a memory accumulation process starts, advertisement information can be acquired and displayed, and new advertisement information can be acquired after finishing the memory accumulation (storing). If advertisement information cannot be acquired within a predetermined time as determined by a timer, advertisement information that has been previously acquired and has been stored can be displayed so that the memory accumulation process can be given priority. Further, when setting an original document at the scanner section is detected, acquisition of advertisement information can be started. If the advertisement information is acquired before the memory accumulation key is depressed and the memory accumulation process is commanded, the acquired advertisement information is displayed. If the advertisement information has not been obtained by that time, advertisement information that has been already accumulated is displayed and the memory accumulating process can be given priority.

Furthermore, in the above-described embodiment, advertisement information is displayed at the display device 14a during the time period of a memory accumulation process. However, the present system is not limited to the above-described embodiment. For example, a display the advertisement information can be provides when the operator is at or close to the apparatus and when it is not necessary to display operational guidance information at the display device 14a. For instance, advertisement information can be displayed at the time of receiving a manual polling transmission.

Further, an operator sensor may be provided to detect if an operator is at or close to the apparatus. Then, advertisement information can be displayed when the operator is at or close to the apparatus and when it is not necessary to display operational guidance information, etc. at the display device 14a. Furthermore, when the operator is at or close to the apparatus and when it is necessary to display operational guidance information, advertisement information can be displayed at a part of the display device 14a, and the operational guidance information can be displayed at the remaining part.

Thus, advertisement information is displayed when a user is at or close to the apparatus. Thereby, the facsimile apparatus can be effectively utilized as an advertisement medium.

Furthermore, the facsimile apparatus 10 can combine (composite) advertisement information acquired from the advertisement server on the Internet with a part of a communication control report.

Figure 5:
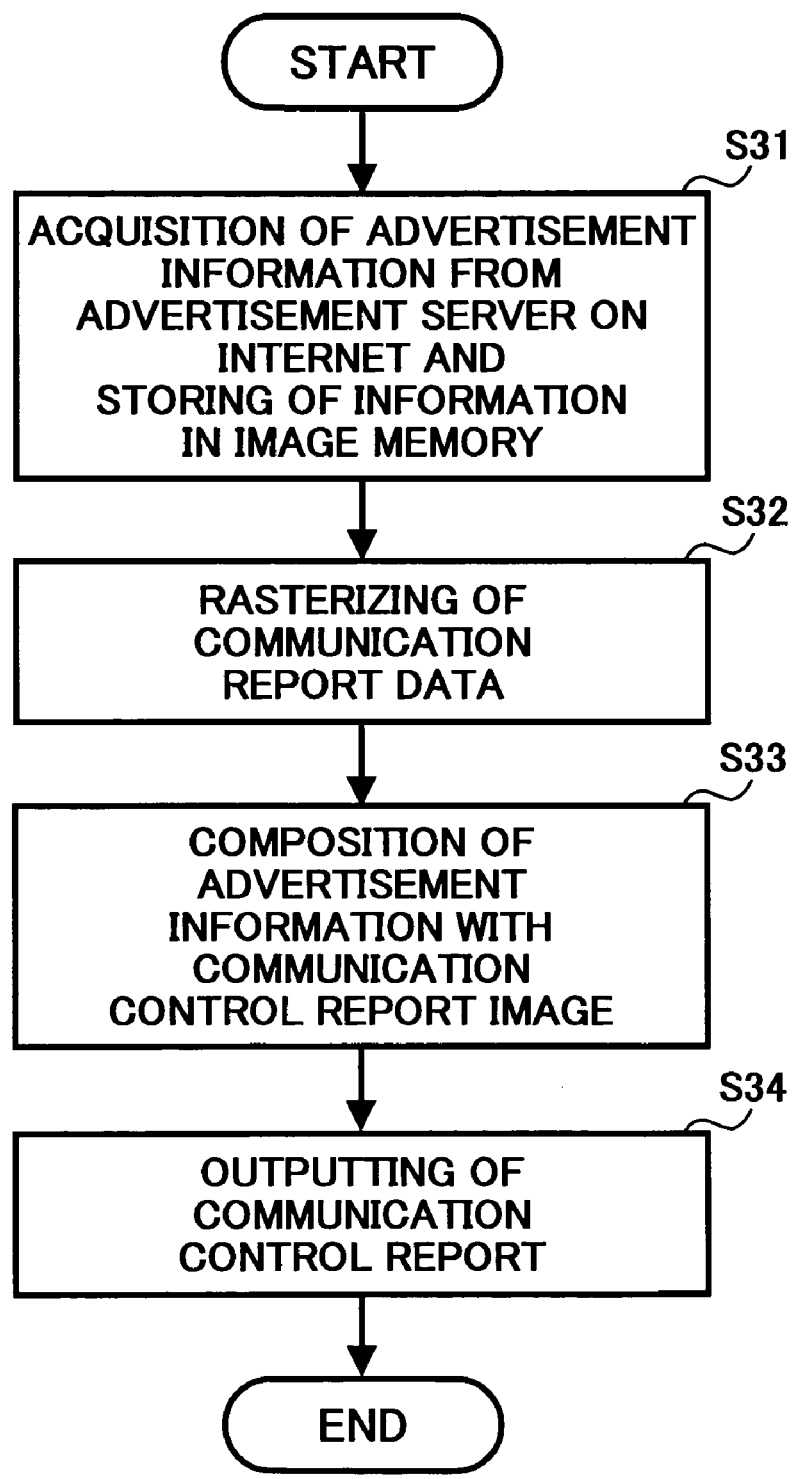
FIG. 5 is a flowchart illustrating a process of composing advertisement information with a communication control report.

As illustrated in the flowchart of FIG. 5, outputting of a communication control report is designated by an inputting operation through the keys of the operation board section 14. The CPU11 acquires advertisement information from the advertisement server 34 on the Internet, e.g., in response to an instruction to output the communication control report when the communication record reaches a predetermined amount or size, and thereafter the advertisement information thus acquired from the advertisement server 34 is stored in the image memory 16 (S31).

Data to be outputted as the communication control report is rasterized and thereby an image of the communication control report is created (S32). The advertisement information stored in the image memory 16 is combined (composited) with the image of the created communication control report (S33) into one image. This combining is carried out such that the advertisement information does not interfere with the communication control report, e.g., the two kinds of information occupy different space in the image, as illustrated in FIG. 6.

The communication control report combined into a single image with the advertisement information is then recorded on a recording paper by the plotter section 17 (S34).

Thus, according to the above-described embodiment, advertisement information is combined (composited) with a communication control report. Therefore, every time a communication control report is outputted, advertisement information can be outputted together therewith, and the Internet facsimile apparatus can be effectively utilized as an advertisement medium.

In the above-described embodiment, although advertisement information is composited with a communication control report and the information thus composited is outputted, the present system is not limited to the above-described embodiment. Advertisement information can be combined (composited) with other reports outputted by the facsimile apparatus. Furthermore, the facsimile apparatus 10 can combine (composite) advertisement information acquired from the advertisement server with an original document to be transmitted and can output the composited information.

Figure 7:
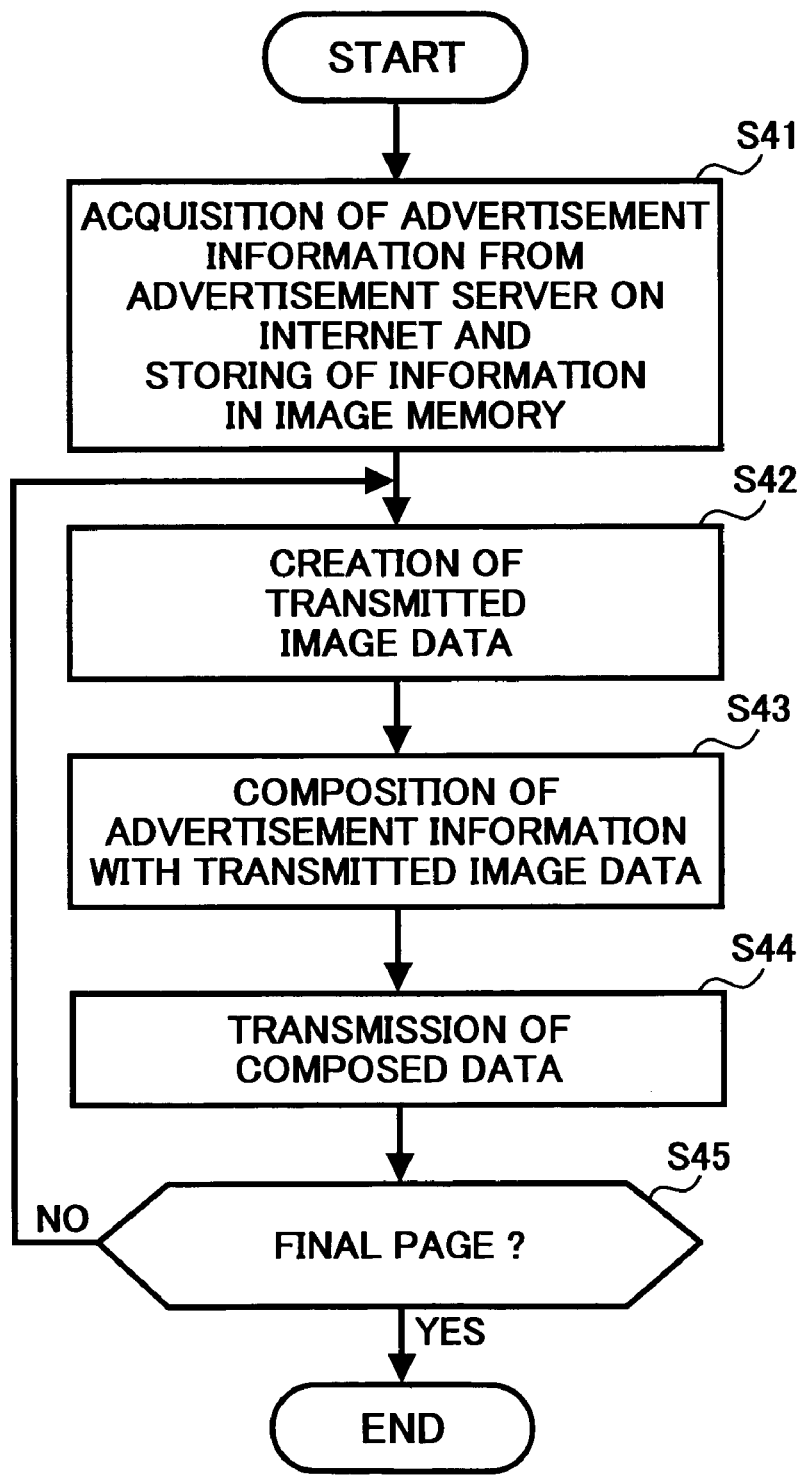
FIG. 7 is a flowchart illustrating a process of composing advertisement information with transmitted image data.

As illustrated in the flowchart of FIG. 7, when the CPU11 is notified of pushing-down of a transmission key on the operation board section 14, the CPU11 starts an operation of reading out an original document by use of the scanner section 18. At the same time, the CPU11 acquires advertisement information from the advertisement server 34 on the Internet and stores the information thus acquired in the image memory 16 (S41).

Compensation and conversion processes are then performed for data of one page of the original document read out by the scanner section 18 and thereby image data is created (S42). The advertisement information stored in the image memory 16 is then composited with the image data thus created (S43).

The composited image data is transmitted to a communication-partner facsimile apparatus through the PSTN or the ISDN by use of the network control section 19 or the ISDN interface section 21 (S44).

Thereafter, a determination is made whether the transmitted page was the final page (S45). If the page is not the final one, the process returns to step S42, and the advertisement information compositing process of the next page is performed. If the page is the final one, the process is terminated.

Thus, according to the above-described embodiment, because advertisement information is composited with a page of an original document to be transmitted, the user receiving the original document can see the advertisement information. In such the way, the facsimile original document can be effectively utilized as an advertisement medium.

Further, the facsimile apparatus 10 prints out the advertisement information acquired from the advertisement server at a constant time interval.

Figure 8:
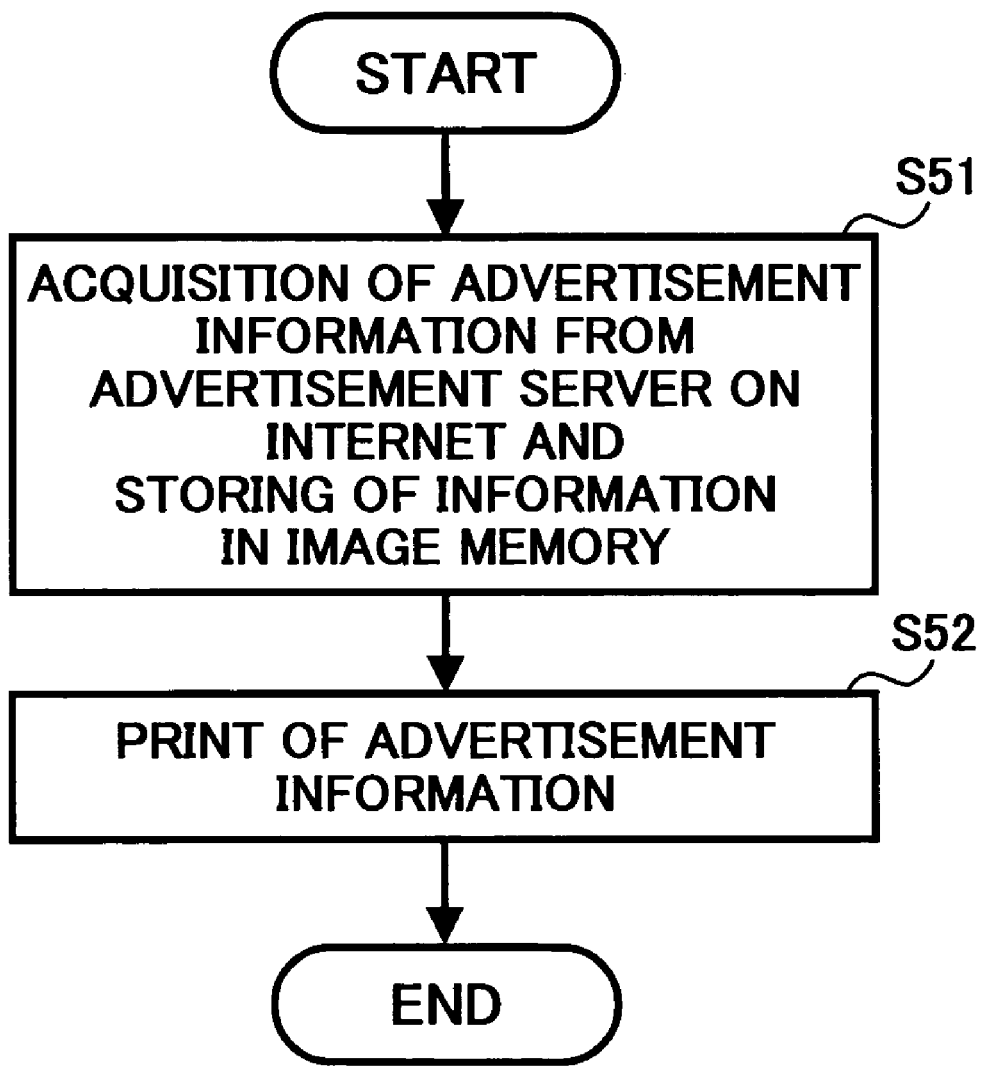
FIG. 8 is a flowchart illustrating a process of printing and outputting advertisement information at a constant time interval.

As illustrated in the flowchart of FIG. 8, the CPU11 starts a process when a timer control section (not shown) provides a notification of an advertisement information outputting time. The timer section can provide such a notification at predetermined times, e.g., at preset intervals of time. In response to such a notification, the CPU11 acquires advertisement information from the advertisement server on the Internet and stores the acquired advertisement information in the image memory 16 (S51).

Next, the CPU11 prints and outputs the advertisement information stored in the image memory by use of the plotter section 17 (S52).

In such the way, according to the above-described embodiment, because advertisement information is printed and outputted at preset time intervals by the plotter section 17, the user can be exposed to advertisement information at preset intervals or times. Thus, the Internet facsimile apparatus can be effectively utilized as an advertisement medium.

Moreover, in the above-described embodiment, the facsimile apparatus 10 is connected with the Internet by communicating with the Internet server on the LAN through the network interface section 15, and electronic mail is transmitted and received by use of the mail server 31 on the LAN. However, the present system is not limited to the above-described embodiment. For instance, the facsimile apparatus 10 can be connected with the Internet via a dial-up connection with an Internet service provider, etc. through the network control section 19 and the MODEM 20, or the ISDN interface section 21, and electronic mail can be transmitted and received by use of a mail server such as the Internet service provider.

Figure 9:
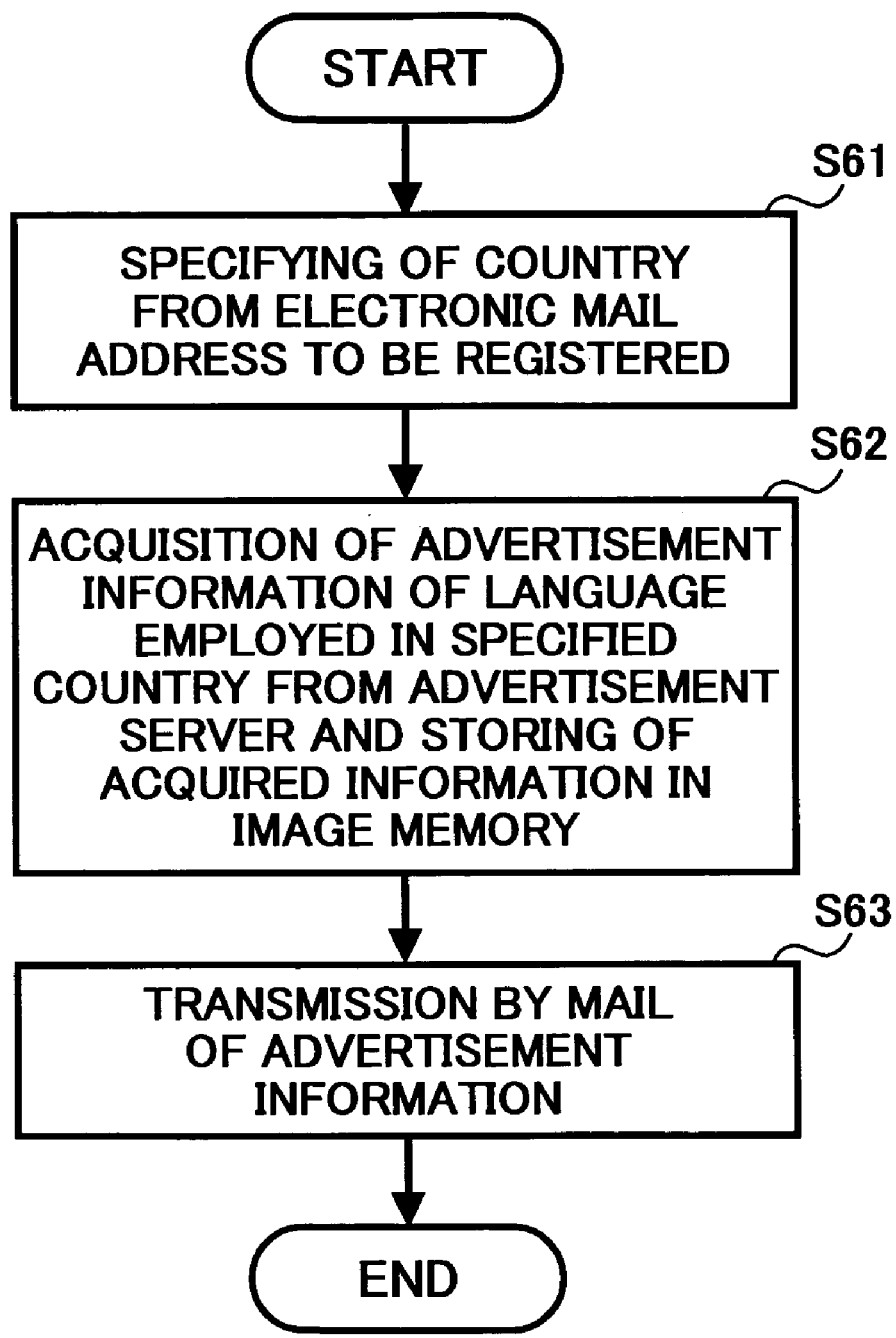
FIG. 9 is a flowchart illustrating another process of displaying advertisement information through the Internet facsimile.

FIG. 9 is a flowchart illustrating another process of displaying advertisement information with an Internet facsimile apparatus according to a preferred embodiment. The CPU 11 starts the process in response to a notification of an output time for advertisement information. The notification can come at preset times, e.g., periodically, from a timer control and can specify the country to be addressed from the domain name of an electronic mail address previously registered (S61). Advertisement information in a language employed in the specified country is acquired from the advertisement server on the Internet and stored in the image memory (S62). For example, in Japan advertisement information in Japanese is acquired but the language identified by another country's number code attached to a telephone number is used rather than Japanese.

The advertisement information is read out from the image memory 16 and transmitted to an electronic mail address (S63). Because the advertisement information is transmitted by the electronic mail at preset times, the user can be exposed to advertisement information at desired times, and thus the facsimile apparatus can be effectively utilized as an advertisement medium. Because the country is specified from the electronic mail address and the advertisement information in the language employed in the specified country is transmitted, the advertisement information is automatically provided in the language likely to be understood by the user, and thereby the facsimile apparatus can be effectively utilized as an advertisement medium. Furthermore, because printing is not required, frequent transmission of advertisement information can be carried out. Plural addresses of electronic mail can be designated and served in this manner.

Figure 10:
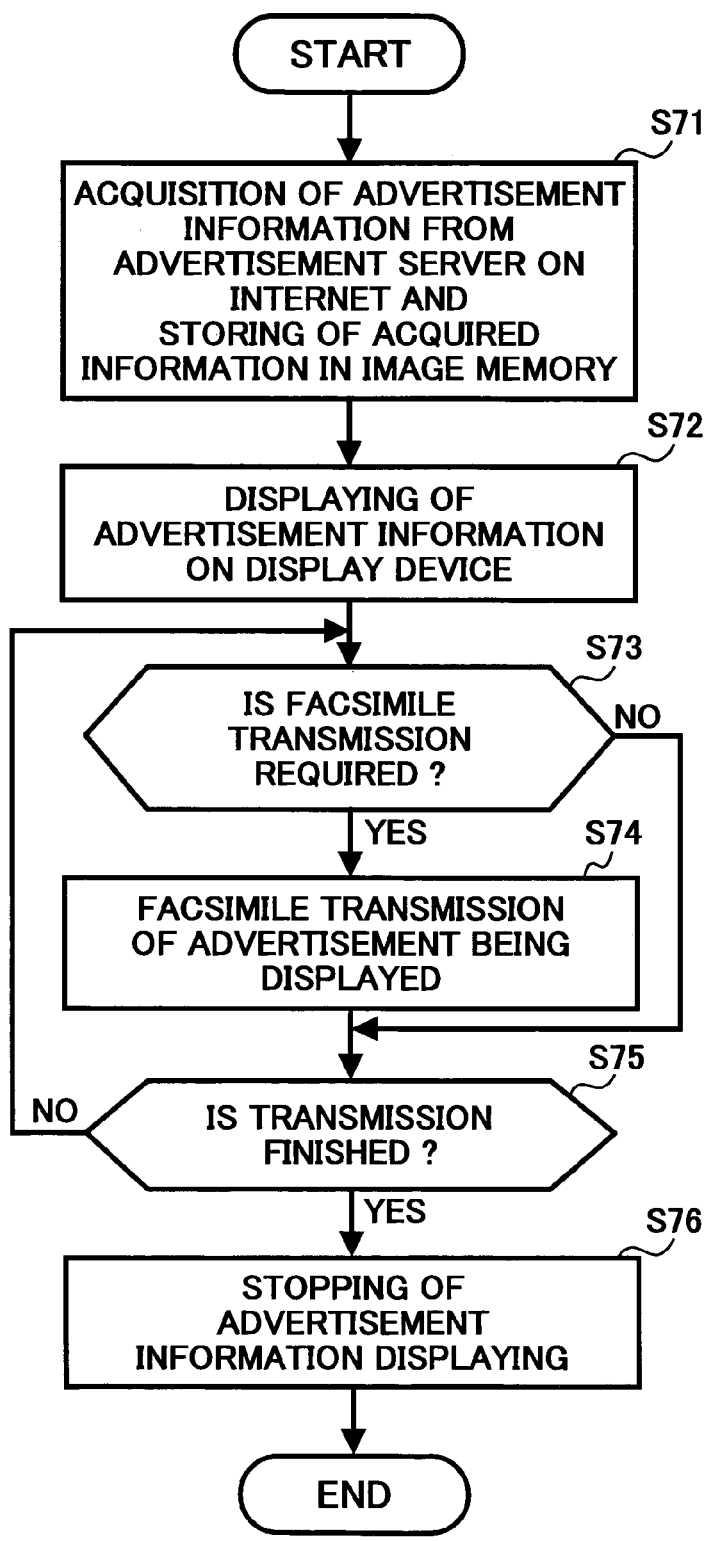
FIG. 10 is a flowchart illustrating another process of displaying advertisement information through the Internet facsimile.

FIG. 10 is a flowchart illustrating another process of displaying advertisement information with an Internet facsimile apparatus according to a preferred embodiment. As illustrated in the flowchart of FIG. 10, the CPU 11 detects the setting of an original document on the scanner section 18. An address is inputted by key operations on the operation board section 14. When the transmission key is pushed and a process of transmission is starts, advertisement information is acquired from the advertisement server 34 on the Internet through the network interface section 15 and stored in the image memory 16 (S71), and the advertisement information is displayed at the display device 14a of the operation board section 14 (S72).

During the displaying of the advertisement information, the CPU 11 determines whether a key on the operation board section 14 has been pushed to designate a requirement that the advertisement information be included in a facsimile transmission (S73).

When such a requirement for facsimile transmission is detected, the advertisement information being displayed and stored in the image memory 16 is transmitted by facsimile transmission to a previously set telephone number (S74). If no such requirement for facsimile transmission has been detected, the next process is performed.

Next, the process determines whether the transmission process has ended (S75). If the process has not ended, the process returns to step S73. If the transmission has ended, the CPU 11 ends the displaying of the advertisement information (S76) and ends the process.

Thus, advertisement information selected by a user can delivered to other users, and the facsimile apparatus can be effectively utilized as an advertisement medium.

Figure 11:
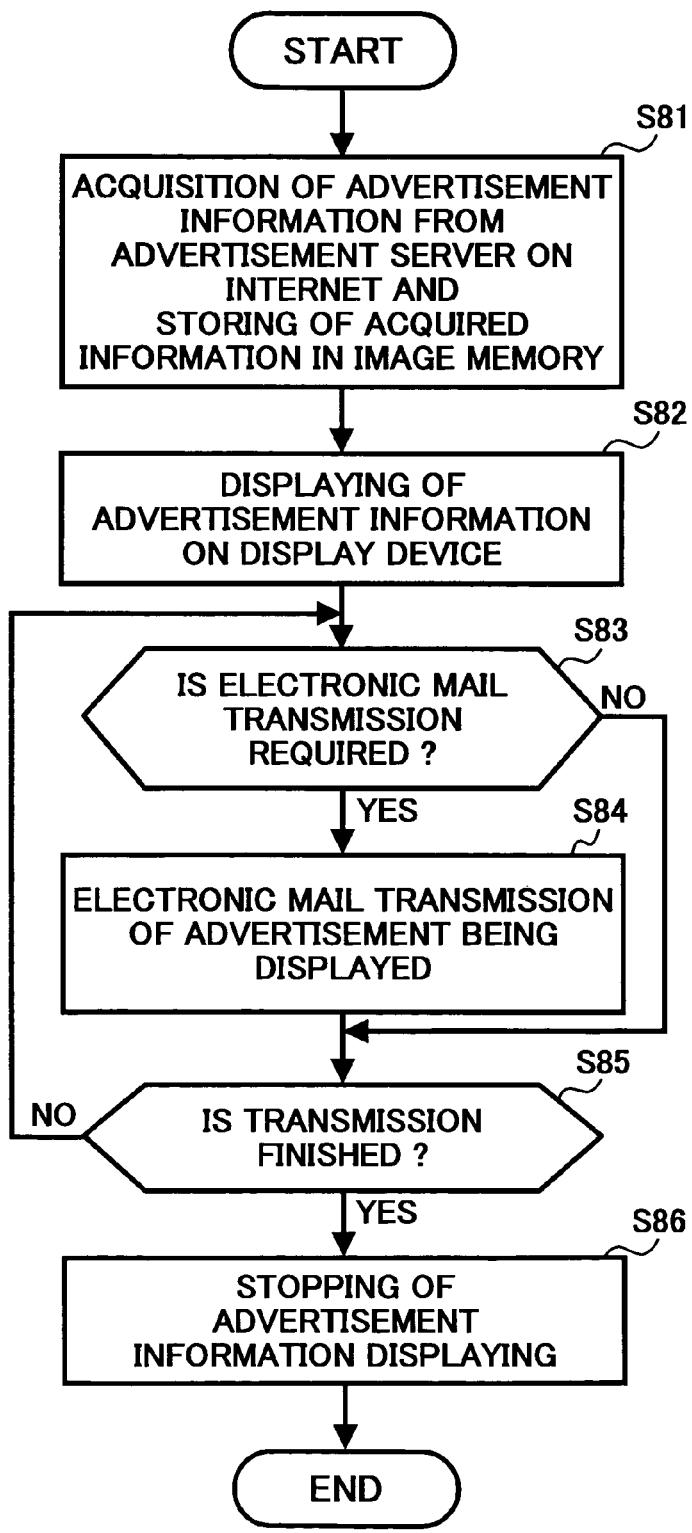
FIG. 11 is a flowchart illustrating another process of displaying advertisement information through the Internet facsimile.

FIG. 11 is a flowchart illustrating another process of displaying advertisement information with an Internet facsimile apparatus according to a preferred embodiment. As illustrated in the flowchart of FIG. 11, the CPU 11 detects a setting of an original document on the scanner section 18. An address is inputted by operating one or more keys on the operation board section 14. Then, when the transmission key is pushed and the process of transmission starts, advertisement information is acquired from the advertisement server 34 on the Internet through the network interface section 15 and stored in the image memory 16 (S81), and the advertisement information is displayed at the display device 14a of the operation board section 14 (S82).

During the displaying of the advertisement information, the CPU 11 determines whether a requirement of electronic mail transmission of the advertisement information has been created by the operating of a key or keys on the operation board section 14 (S83).

If such a requirement of electronic mail transmission is detected, the advertisement information being displayed and stored in the image memory 16 is transmitted by electronic mail to a previously set electronic mail address (S84). If no such requirement of electronic mail transmission is detected, the next process is performed.

Next, it is determined whether the transmission process has ended (S75). If the transmission process has not ended, the process returns to step S83. If the transmission has ended, the CPU 11 ends the displaying of the advertisement information (S86) and ends the process.

Thus, advertisement information selected by a user can be sent by electronic mail to and can be read by other users, and the facsimile apparatus can be effectively utilized as an advertisement medium.

Figure 12:
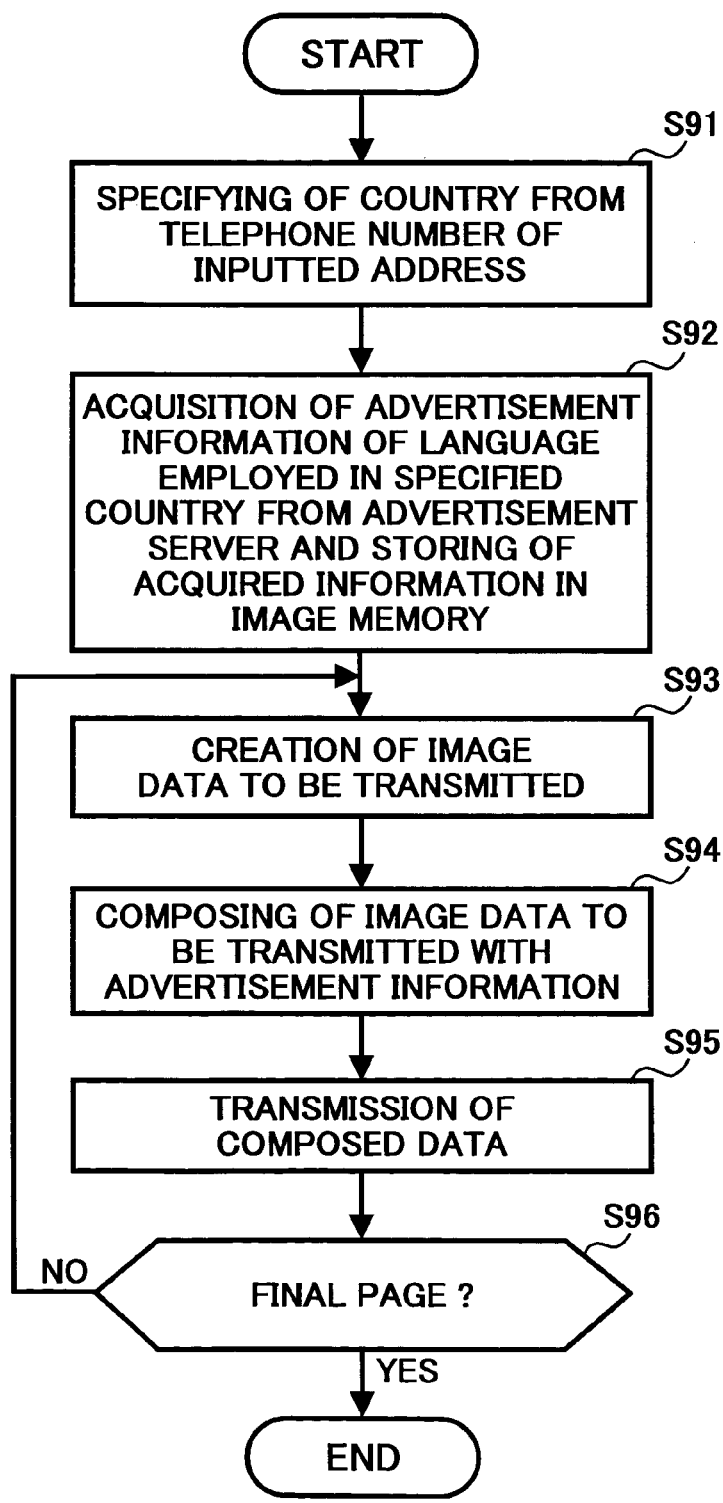
FIG. 12 is a flowchart illustrating another process of displaying advertisement information through the Internet facsimile.

FIG. 12 is a flowchart illustrating another process of displaying advertisement information with an Internet facsimile apparatus according to a preferred embodiment. As illustrated in the flowchart of FIG. 12, the CPU 11 detects a setting of an original document on the scanner section 18. An address is inputted by key operation on the operation board section 14. Then, when the transmission key is pushed and the process of transmission starts, the operation of reading a transmission original document starts at the scanner section 18, and at the same time, information identifying the country to be addressed is obtained from the telephone number of the inputted address (S91). Advertisement information in the language employed in the specified country is acquired from the advertisement server 34, and stored in the image memory 16 (S92). For example, in Japan advertisement information in Japanese is acquired. For other countries, advertisement information in the language of the respective country is acquired.

Next, data of one page of the original document read by the scanner section 18 are processed through compensation and conversion processes and thereby image data is created (S93). The acquired advertisement information is read out from the image memory 16 and is composited with the image data thus created (S94).

The composited image data is then transmitted to a transmission destination facsimile apparatus through the PSTN or the ISDN by the network control section 19 or the ISND interface section 21 (S95).

Next, a test is made to check if the transmitted page is the final page (S96). If the transmitted page is the final one, the process returns to step S93 and performs the advertisement information compositing process of the next page. If the transmitted page is the final one, the process is ended.

As described heretofore, advertisement information in the language of the country where the destination facsimile apparatus is located can be added. Thereby, the advertisement information is likely to be understood by the user, and the facsimile apparatus can be effectively utilized as an advertisement medium.

Figure 13:
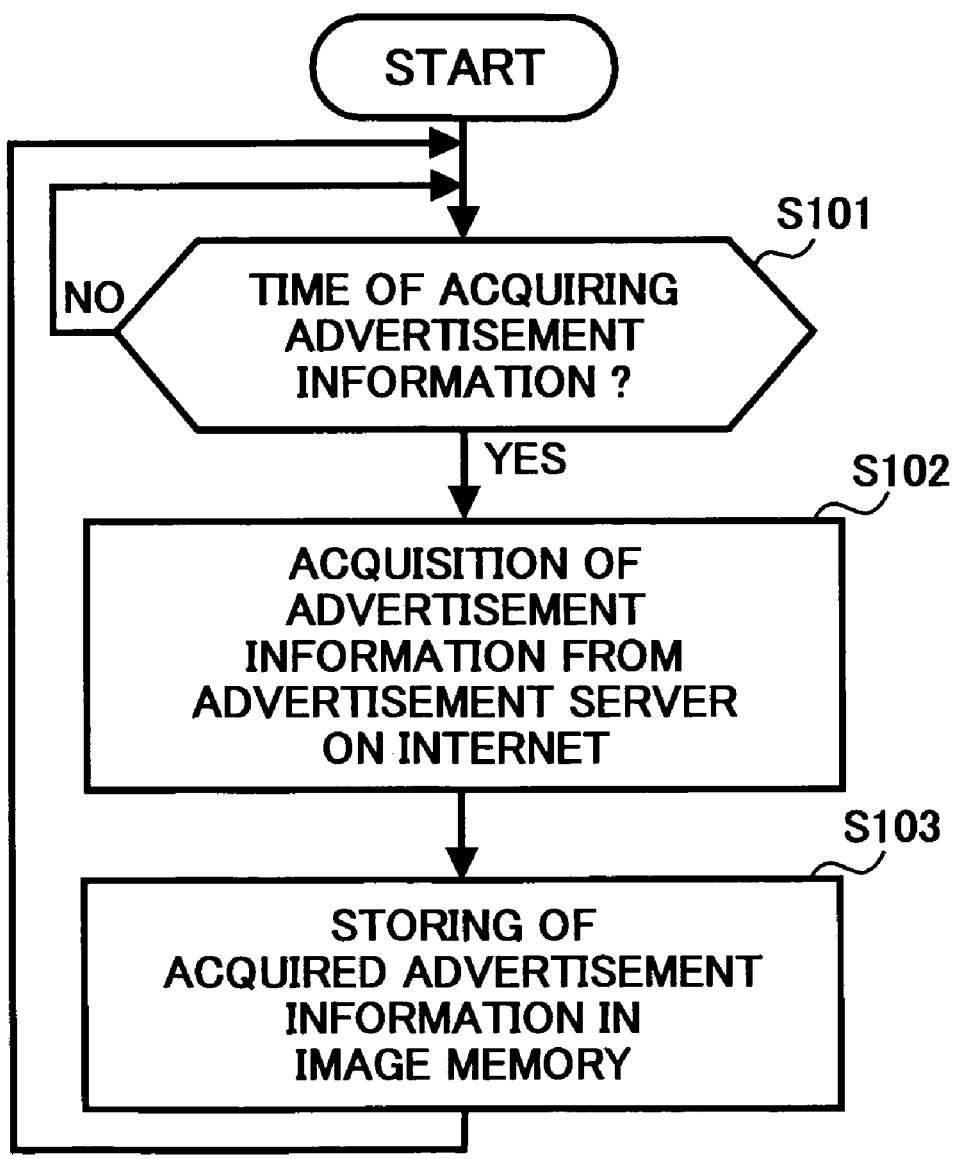
FIG. 13 is a flowchart illustrating another process of displaying advertisement information through the Internet facsimile.

FIG. 13 is a flowchart illustrating another process of displaying advertisement information with an Internet facsimile apparatus according to a preferred embodiment. As illustrated in the flowchart of FIG. 13, the CPU 11 waits for a notification of an acquisition time for acquiring advertisement information from a timer control (S101). This notification can be generated at present times, e.g., periodically. When a notification of the advertisement information acquiring time from the timer control arrives at the facsimile apparatus, advertisement information is acquired from the advertisement server on the Internet (S102). The acquired advertisement information is stored in the image memory 16 (S103). Then, the process returns to the step 101 and waits for the next advertisement information acquiring time.

Thus, access to the Internet can be reduced, and thereby expenses for access to the Internet can be reduced.

Figure 14:
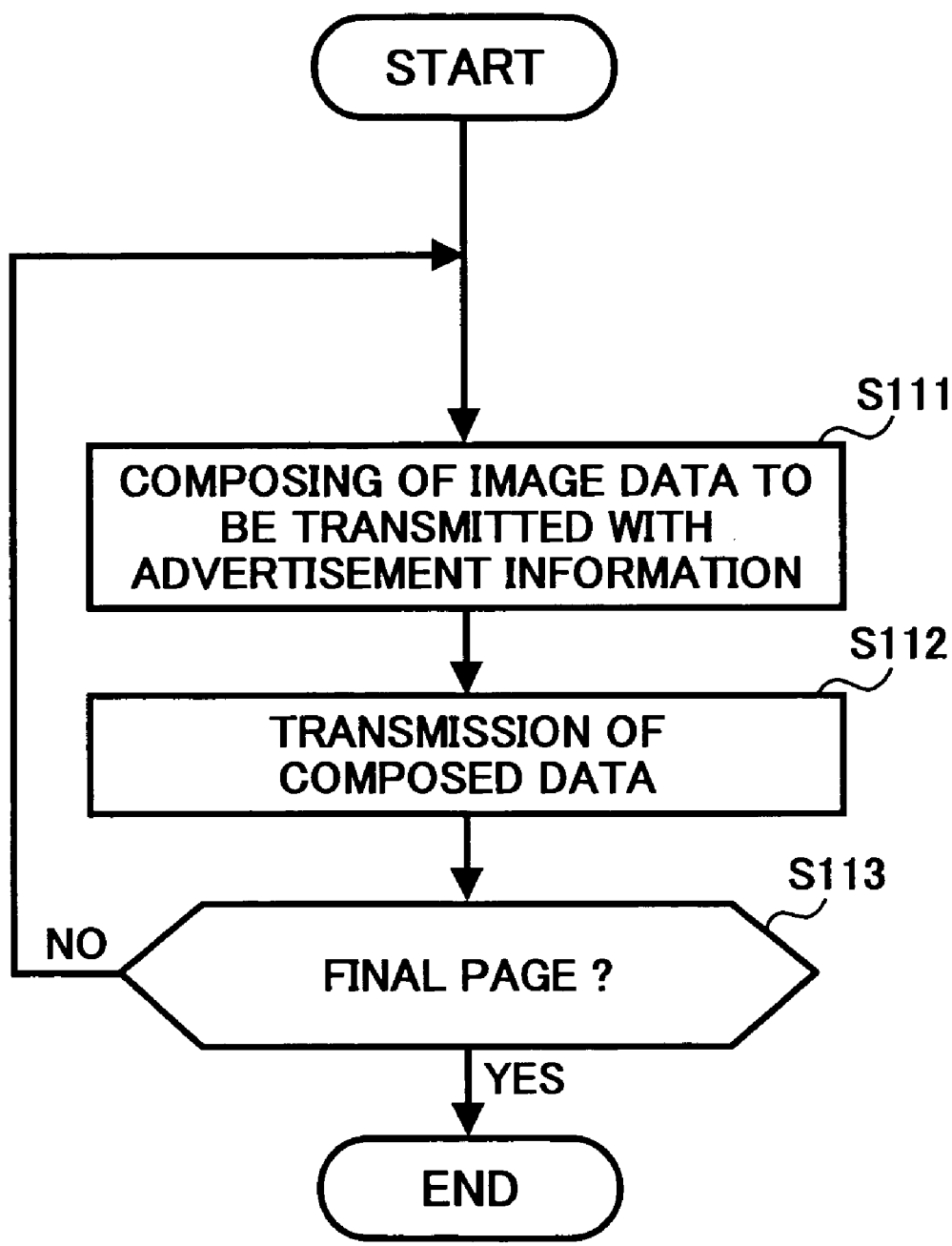
FIG. 14 is a flowchart illustrating another process of displaying advertisement information through the Internet facsimile.

FIG. 14 is a flowchart illustrating another process of displaying advertisement information with an Internet facsimile apparatus according to a preferred embodiment. As illustrated in the flow chart of FIG. 14, during a time period when advertisement information is displayed on the display device 14a of the operation board section 14, the CPU 11 composite (combines) image data to be transmitted with advertisement information displayed at the display device 14a. E.g., if an appropriate request is keyed in at the operation board section 14 (S111). The image data thus composited is transmitted to a transmission destination facsimile apparatus by the network control section 19 or the ISDN interface section 21 through the PSTN or the ISDN (S112).

Then, the process tests if the transmitted page is the final one (S1 3). If the transmitted page is not the final one, the process returns to step S111, and the advertisement information compositing process of the next page is performed. If the transmitted page is the final one, the process is ended.

Thus, advertisement information corresponding to a transmission destination address can be transmitted. Thereby, the facsimile apparatus can be effectively utilized as an advertisement medium.

Furthermore, in another embodiment, not specifically illustrated in the figures, the frequency (number of times) of displaying advertisement information at the display device 14a, the compositing advertisement information with a communication control report and printing and outputting the composed information, the number of pages transmitted after composing advertisement information, the frequency of transmitting advertisement information as electronic mail, etc. are respectively counted, and the counted values are memorized in the RAM 13. By providing a sponsor with the above-described information, it becomes possible to charge the sponsor, for example according to the number of times of outputting advertisement information of the sponsor, in organizing a system utilizing the above-described Internet facsimile apparatus.

As is apparent from the foregoing description, because advertisement information is displayed on a display device of a facsimile apparatus during the time period of facsimile transmission or storing image data for transmission in a memory, advertisement information on the Internet can be effectively offered to the user of the apparatus.

Furthermore, by outputting advertisement information being displayed to an outputting device, the advertisement information required by the user can be easily printed on a sheet. Thereby, the facsimile apparatus can be effectively utilized as an advertisement medium.

Furthermore, by transmitting advertisement information being displayed by facsimile transmission, the advertisement information selected by the user can be seen by a facsimile receiver. Thereby, the Internet facsimile apparatus can be effectively utilized as an advertisement medium.

Furthermore, by transmitting advertisement information being displayed by electronic mail, the advertisement information selected by the user and thus transmitted by the electronic mail can be seen by the electronic mail receiver. Thereby, the Internet facsimile apparatus can be effectively utilized as an advertisement medium.

Furthermore, by composing advertisement information with a communication control report, because the user seeing the communication control report also sees the advertisement information, the number of opportunities for the user to see the advertisement information can be increased. Thereby, the Internet facsimile apparatus can be effectively utilized as an advertisement medium.

Furthermore, by compositing advertisement information with a part of transmitted image data, the facsimile recipient sees the advertisement information together with the received facsimile page(s), whereby the exposure of a user to advertisement information can be increased. Thereby, the Internet facsimile apparatus can be effectively utilized as an advertisement medium.

Furthermore, by outputting advertisement information to an outputting device at preset or otherwise timed time interval, the user can be exposed to advertisement information on an increased number of occasions. Thereby, the Internet facsimile apparatus can be effectively utilized as an advertisement medium.

Furthermore, by transmitting advertisement information by electronic mail to a previously set address at a constant time interval, because the receiver of the electronic mail periodically sees the advertisement information, the number of opportunities for the user to see the advertisement information can be increased. Thereby, the Internet facsimile apparatus can be effectively utilized as an advertisement medium.

Furthermore, by specifying the country of a communication destination from the telephone number of the destination and by composing advertisement information of the language used in the specified country with a part of transmitted image data, it is possible to cause the facsimile receiver to surely read the advertisement information. Thereby, the Internet facsimile apparatus can be effectively utilized as an advertisement medium.

Furthermore, by acquiring advertisement information from an advertisement server at preset or otherwise determined time intervals, Internet access costs can be reduced. Thereby, the cost of the Internet facsimile apparatus can be reduced.

Furthermore, by identifying the country of a communication destination from the telephone number of the communication destination, and supplying advertisement information in the language of the specified country as a part of the facsimile transmission, the transmitted advertisement information is likely to be understood by the user of the receiving facsimile apparatus. Thereby, the facsimile apparatus can be effectively utilized.

Furthermore, by identifying the country of a transmission destination from the electronic mail address of the destination by electronic mail, advertisement information in the language of the specified country is transmitted by electronic mail. Thereby, the advertisement information is likely to be understood by the electronic mail receiver, and the facsimile apparatus can be effectively utilized.

Furthermore, by acquiring advertisement information from an advertisement server at preset or otherwise determined time intervals, Internet access expenses can be reduced.

Preferred embodiments have been described heretofore. However, the present invention is not limited to the above-described embodiments, and numerous additional modifications and variations of the present invention are possible in light of the above teachings. It is therefore to be understood that, within the scope of the appended claims, the present invention may be practiced other than as specifically described herein.

This application claims benefit of priority under 35 U.S.C. § 119 to Japanese Patent Applications Nos. 2000-072654 and 2001-40422 respectively filed in the Japanese Patent Office on Mar. 15, 2000, and Feb. 16, 2001, the entire contents of which are incorporated by reference.

What is claimed is:

1. A facsimile apparatus, comprising:

a scanner section for scanning a document and generating image data corresponding to the scanned document to be transmitted;

a network interface device connected to a network and configured to transmit and receive facsimile data therebetween;

an advertisement information acquiring device configured to acquire advertisement information from an advertisement server connected to said data network via said network interface device;

a display device to display the advertisement information acquired from said advertisement information acquiring device; and a displaying control device, wherein said displaying control device causes the advertisement information to be displayed when said document is being scanned and said image data is being accumulated, wherein said displaying control device composes the advertisement information with a part of transmission image data, wherein said displaying control device specifies a transmission destination country from a telephone number of a facsimile transmission address, and wherein said displaying control device composes the advertisement information of a language employed in the specified country with the part of transmission image data.

2. The facsimile apparatus as defined in claim 1, wherein said displaying control device controls said display device to display the advertisement information during a time period of transmitting facsimile data.

3. The facsimile apparatus as defined in claim 1, further comprising:

a facsimile data storing device configured to store facsimile data;

wherein said displaying control device controls said display device to display the advertisement information during a time period of storing the facsimile data.

4. The facsimile apparatus of claim 1, wherein the advertisement information is displayed on the display device while the document is being scanned by the scanning device.

5. The facsimile apparatus of claim 1, wherein display of the advertisement information on the display device is terminated upon completion of transmission of the document by the facsimile apparatus.

6. A facsimile apparatus, comprising:

a scanner section for scanning a document and generating image data corresponding to the scanned document to be transmitted;

a network interface device connected to a network and configured to transmit and receive facsimile data therebetween;

an advertisement information acquiring device configured to acquire advertisement information from an advertisement server connected to said data network via said network interface devise;

a display device to display the advertisement information acquired from said advertisement information acquiring device;

a displaying control device; and an advertisement information facsimile transmission device configured to instruct facsimile transmission of the advertisement information displayed on said display device; and wherein said displaying control device causes the advertisement information to be displayed when said document is being scanned and said image data is being accumulated.

wherein said displaying control device transmits by facsimile transmission the advertisement information instructed by said advertisement information facsimile transmission instructing device to a previously set address, wherein said displaying control device specifies a transmission destination country from a telephone number of a facsimile transmission address, and wherein said displaying control device transmits by facsimile transmission the advertisement information of a language employed in the specified country.

7. A facsimile apparatus, comprising:

a scanner section for scanning a document and generating image data corresponding to the scanned document to be transmitted;

a network interface device connected to a network and configured to transmit and receive facsimile data therebetween;

an advertisement information acquiring device configured to acquire advertisement information from an advertisement server connected to said data network via said network interface device;

a display device to display advertisement information acquired from said advertisement information acquiring device; and a displaying control device, wherein said displaying control device causes the advertisement information to be displayed when said document is being scanned and said image data is being accumulated, wherein said displaying control device transmits the advertisement information by electronic mail to a previously set address at a constant time interval, wherein said displaying control device specifies a transmission destination country from an electronic mail address of electronic mail transmission, and wherein said displaying control device transmits the advertisement information of a language employed in the specified country.

8. A method of displaying advertisement information in a facsimile apparatus connected to a network, comprising steps of:

scanning by the facsimile apparatus a document and generating image data corresponding to the scanned document to be transmitted;

acquiring by the facsimile apparatus the advertisement information from an advertisement server connected to a network trough said network;

detecting with an operator sensor that an operator is at or near said facsimile apparatus; and displaying the acquired advertisement information on a display device of the facsimile apparatus when said operator is at or near said facsimile apparatus.

9. The method as defined in claim 8, wherein the step of displaying the acquired advertisement information include steps of:

displaying the acquired advertisement information on said display device at a time of starting facsimile transmission; and ending the displaying of the advertisement information on said display device at a time of ending the facsimile transmission.

10. The method as defined in claim 8, wherein the step of displaying the acquired advertisement information include steps of:

displaying the acquired advertisement information on the display device at a time of starting storing of facsimile data for transmission in a storage device of the facsimile apparatus; and ending the displaying of the advertisement information on said display device at a time of ending the storing of the facsimile data for transmission in the storage device.

11. The method as defined in claim 8, further comprising a step of:

outputting the advertisement information in accordance with an instruction of outputting the advertisement information displayed on said display device.

12. The method as defined in claim 8, further comprising a step of:

transmitting by facsimile transmission the advertisement information in accordance with an instruction of transmitting by facsimile transmission the advertisement information displayed on the display device.

13. The method in claim 8, further comprising a step of:
transmitting by electronic mail the advertisement information in accordance with an instruction of transmitting by electronic mail the advertisement information displayed on said display device.

14. The method as defined in claim 8, further comprising a step of:
composing the advertisement information with a communication control report.

15. The method as defined in claims 8, further comprising a step of:
composing the advertisement information with a part of transmission image data.

16. The method as defined in claim 8, further comprising a step of:
outputting the advertisement information to an outputting device of the facsimile apparatus at a constant time interval.

17. The method as defined in claim 8, further comprising a step of:
transmitting the advertisement information by electronic mail to a previously set address at a constant time interval.

18. The method as defined in claim 8, wherein the advertisement information from said advertisement server is acquired at a constant time interval.

19. The method of claim 8, wherein said network comprises at least one of an ISDN, a LAN, a WAN, and a telephone line.

20. The method of claim 8, wherein at least a portion of said network is the Internet.

21. A method of displaying advertisement information in a facsimile apparatus connected to a network, comprising the steps of:
scanning by the facsimile apparatus a document and generating image data corresponding to the scanned document to be transmitted;
acquiring by the facsimile apparatus the advertisement information from an advertisement server connected to a network through said network; and
displaying the acquired advertisement information on a display device of the facsimile apparatus when said document is being scanned and said image data is being accumulated;
specifying a transmission destination country from a telephone number of a facsimile transmission address; and
composing the advertisement information with a part of transmission image data,
wherein the composing composes the advertisement information of a language employed in the specified country with a part of transmission image data.

22. A method of displaying advertisement information in a facsimile apparatus connected to a network, comprising the steps of:
scanning by the facsimile apparatus a document and generating image data corresponding to the scanned document to be transmitted;
acquiring by the facsimile apparatus the advertisement information from an advertisement server connected to a network through said network; and
displaying the acquired advertisement information on a display device of the facsimile apparatus when said document is being scanned and said image data is being accumulated;
specifying a transmission destination country from a telephone number of a facsimile transmission address; and
transmitting by facsimile transmission the advertisement information in accordance with an instruction of transmitting by facsimile transmission the advertisement information displayed on the display device,
wherein the transmitting transmits by facsimile transmission the advertisement information of a language employed in the specified country.

23. A method of displaying advertisement information in a facsimile apparatus connected to a network, comprising the steps of:
scanning by the facsimile apparatus a document and generating image data corresponding to the scanned document to be transmitted;
acquiring by the facsimile apparatus the advertisement information from an advertisement server connected to a network through said network; and
displaying the acquired advertisement information on a display device of the facsimile apparatus when said document is being scanned and said image data is being accumulated;
specifying a transmission destination country from an electronic mail address of electronic mail transmission; and
transmitting by electronic mail the advertisement information in accordance with an instruction of transmitting by electronic mail the advertisement information displayed on said display device,
wherein the transmitting transmits as electronic mail the advertisement information of a language employed in the specified country.

24. A communication system, comprising:
a network connecting plural terminal devices with transmission paths and transmitting/receiving data between said plural terminal devices through said transmission paths;
an advertisement server connected to said network; and
a facsimile apparatus including:
a scanner section for scanning a document and generating image data corresponding to the scanned document to be transmitted;
a network interface device connected to said network and capable of transmitting and receiving facsimile data therebetween;
an advertisement information acquiring device configured to acquire advertisement information from said advertisement server through said network interface device;
an operator sensor;
a display device for displaying the advertisement information acquired by said advertisement information acquiring device; and
a displaying control device configured to control the displaying of the advertisement information,
wherein said displaying control device causes the advertisement information to be displayed when said operator sensor detects that an operator is at or near said facsimile apparatus.

25. The system of claim 24, wherein said network comprises at least one of an ISDN, a LAN, a WAN, and a telephone line.

26. The system of claim 24, wherein said network interface device is configured to transmit data to and receive data from a device over at least one of an ISDN, a LAN, a WAN, and a telephone line.

27. The method of claim 19, wherein at least a portion of said ISDN, LAN, WAN, and telephone line is the Internet.

28. The system of claim 24, wherein at least a portion of said network is the Internet.

29. The system of claim 25, wherein at least a portion of said ISDN, LAN, WAN, and telephone line is the Internet.

30. The system of claim 26, wherein at least a portion of said ISDN, LAN, WAN, and telephone line is the Internet.

31. A facsimile apparatus, comprising:
a scanner section for scanning a document and generating image data corresponding to the scanned document to be transmitted;
means for connecting to a network and for transmitting and receiving facsimile data therebetween;
means for acquiring advertisement information from an advertisement server connected to said network via said connecting means;
operator sensing means for detecting that an operator is at or near said facsimile apparatus;
means for displaying the advertisement information acquired from said advertisement information acquiring means; and
means for controlling the displaying of the advertisement information,
wherein said means for controlling causes the advertisement information to be displayed when said operator sensing means detects that the operator is at or near said facsimile apparatus.

32. A communication system, comprising:
a network connecting plural terminal devices and transmitting/receiving data between said plural terminal devices;
an advertisement server connected to the network; and
a facsimile apparatus including;
a scanner section for scanning a document and generating image data corresponding to the scanned document to be transmitted;
means for connecting to said network and for transmitting and receiving facsimile data therebetween;
means for acquiring advertisement information from said advertisement server through said connecting means;
operator sensing means for detecting that an operator is at or near said facsimile apparatus;
means for displaying the advertisement information acquired by said advertisement information acquiring means; and
means for controlling the displaying of the advertisement information,
wherein said means for control causes the advertisement information to be displayed when said operator sensing means detects that the operator is at or near said facsimile apparatus.

33. A machine readable medium tangibly embodying a program of instructions that when executed by the a processor of a facsimile apparatus, implement on said facsimile apparatus,
an advertisement information acquiring mechanism configured to acquire advertisement information from an advisement server connected to a network through said network at a constant time interval; and
a displaying mechanism configured to display the acquired advertisement information on a display device of the facsimile apparatus when an operator sensor detects that an operator is at or near said facsimile apparatus.

34. The machine readable medium of claim 33, wherein the displaying mechanism is configured to display the acquired advertisement information on said display device at a time of starting facsimile transmission, and to end the displaying of the advertisement information on said display device at a time of ending the facsimile transmission.

35. The machine readable medium of claim 33, wherein the displaying mechanism is configured to display the acquired advertisement information on the display device at a time of starring storing of facsimile data for transmission in a storage device of the facsimile apparatus, and to end the displaying of the advertisement information on said display device at a time of ending the storing of the facsimile data for transmission in the storage device.

36. The machine readable medium of claim 33, wherein the program storage device further stores additional instructions that, when executed by the processor of the facsimile apparatus implement,
an outputting mechanism configured to output the advertisement information in accordance with an instruction of outputting the advertisement information displayed on said display device.

37. The machine readable medium of claim 33, wherein the program storage device further stores additional instructions that, when executed by the processor of the facsimile apparatus, implement,
a facsimile transmission mechanism configured to transmit by facsimile transmission the advertisement information in accordance with an instruction of transmitting by facsimile transmission the advertisement information displayed on the display device.

38. The machine readable medium of claim 33, wherein the program storage device further stores additional instructions that, when executed by the processor of the facsimile apparatus, implement,
an electronic transmission mechanism configured to transmit by electronic mail the advertisement information in accordance with an instruction of transmitting by electronic mail the advertisement information displayed on said display device.

39. The machine readable medium of claim 33, wherein the program storage device further stores additional instructions that, when executed by the processor of the facsimile apparatus, implement,
a composing mechanism configured to compose the advertisement information with a communication control report.

40. The machine readable medium of claim 33, wherein the program storage device further stores additional instructions that, when executed by the processor of the facsimile apparatus, implement,
another composing mechanism configured to compose the advertisement information with a part of transmission image data.

41. The machine readable medium of claim 33, wherein the program storage device further stores additional instructions that, when executed by the processor of the facsimile apparatus, implement,
an outputting mechanism configured to output the advertisement information to an outputting device of the facsimile apparatus at a constant time interval.

42. The machine readable medium of claim 33, wherein the program storage device further stores additional instructions that, when executed by the processor of the facsimile apparatus, implement, an electronic mail transmission mechanism configured to transmit the advertisement information by electronic mail to a previously set address at a constant time interval.

43. The machine readable medium of claim 33, wherein the acquiring mechanism is configured to acquire the advertisement information from said advertisement server at a constant time interval.

44. The machine readable medium of claim 33, wherein said network comprises at least one of an ISDN, a LAN, a WAN, and a telephone line.

45. The machine readable medium of claim 33, wherein at least a portion of said network is the Internet.

46. The machine readable medium of claim 44, wherein at least a portion of said ISDN, LAN, WAN, and telephone line is the Internet.

47. A machine readable medium tangibly embodying a program of instructions that when executed by a processor of a facsimile apparatus, implement on said facsimile apparatus;

an advertisement information acquiring mechanism configured to acquire advertisement information from an advertisement server connected to a network through said network at a constant time interval;

a displaying mechanism configured to display the acquired advertisement information on a display device of the facsimile apparatus;

a destination country specifying mechanism configured to specify a transmission destination country from a telephone number of a facsimile transmission address; and a composing mechanism configured to compose the advertisement information with a part of transmission image data, wherein the composing mechanism is configured to compose the advertisement information of a language employed in the specified country with the part of transmission image data.

48. A machine readable medium tangibly embodying a program of instructions that when executed by a processor of a facsimile apparatus, implement on said facsimile apparatus:

an advertisement information acquiring mechanism configured to acquire advertisement information from an advertisement server connected to a network trough said network at a constant time interval;

a displaying mechanism configured to display the acquired advertisement information on a display device of the facsimile apparatus;

a specifying mechanism configured to specify a transmission destination country from a telephone number of a facsimile transmission address; and a facsimile transmission mechanism configured to transmit by facsimile transmission the advertisement information in accordance with an instruction of transmitting by facsimile transmission the advertisement information displayed on the display device, wherein the facsimile transmission mechanism is configured to transmit by facsimile transmission the advertisement information of a language employed in the specified country.

49. A machine readable medium tangibly embodying a program of instructions that when executed by a processor of a facsimile apparatus, implement on said facsimile apparatus:

an advertisement information acquiring mechanism configured to acquire advertisement information from an advertisement server connected to a network through said network at a constant time interval;

a displaying mechanism configured to display the acquired advertisement information on a display device of the facsimile apparatus;

a composing mechanism configured to compose the advertisement information with a communication control report;

a specifying mechanism configured to specify a transmission destination country from an electronic mail address of electronic mail transmission; and an electronic transmission mechanism configured to transmit as electronic mail the advertisement information of a language employed in the specified country.

50. A facsimile apparatus comprising a scanner section for scanning a document and generating image data corresponding to the scanned document to be transmitted;

a network interface device connected to a network and configured to transmit and receive facsimile data therebetween;

an advertisement information acquiring device configured to acquire advertisement information from an advertisement server connected to said data network via said network interface device;

a display device to display the advertisement information acquired from said advertisement information acquiring device;

a displaying control device;

an operator sensor, wherein said control device causes the advertisement information to be displayed on said display device when said operator sensor detects that an operator is at or near said facsimile apparatus.

51. The facsimile apparatus as defined in claim 50, further comprising:

an outputting device configured to output the advertisement information;

an advertisement information output instructing device configured to instruct outputting of the advertisement information displayed on said display device; and wherein said displaying control device outputs the advertisement information instructed by said advertisement information output instructing device with the outputting device.

52. The facsimile apparatus as defined in claim 50, further comprising:

an advertisement information facsimile transmission instructing device configured to instruct facsimile transmission of the advertisement information displayed on said display device; and wherein said displaying control device transmits by facsimile transmission the advertisement information instructed by said advertisement information facsimile transmission instructing device to a previously set address.

53. The facsimile apparatus as defined in claim 50, further comprising:

an advertisement information mail transmission instructing device configured to instruct electronic mail transmission of the advertisement information displayed on said display device; and wherein said displaying control device transmits by electronic mail the advertisement information instructed by said advertisement information mail transmission instructing device to a previously set address.

54. The facsimile apparatus as defined in claim 50, wherein said displaying control device composes the advertisement information with a communication control report.

55. The facsimile apparatus as defined in claim 50, wherein said displaying control device composes the advertisement information with a part of transmission image data.

56. The facsimile apparatus as defined in claim 50, further comprising:

an outputting device configured to output the advertisement information;

wherein said displaying control device outputs the advertisement information to the outputting device at a constant time interval.

57. The facsimile apparatus as defined in claim 50, wherein said displaying control device transmits the advertisement information by electronic mail to a previously set address at a constant time interval.

58. The facsimile apparatus of claim 50, wherein said network comprises at least one of an ISDN, a LAN, a WAN, and a telephone line.

59. The facsimile apparatus of claim 50, wherein said network interface device is configured to transmit data to and receive data from a device over at least one of an ISDN, a LAN, a WAN, and a telephone line.

60. The facsimile apparatus of claim 50, wherein at least a portion of said network is the Internet.

61. The facsimile apparatus of claim 58, wherein at least a portion of said ISDN, LAN, WAN, and telephone line is the Internet.

62. The facsimile apparats of claim 59, wherein at least a portion of said ISDN, LAN, WAN, and telephone line is the Internet.

63. A facsimile apparatus, comprising:

a scanner section for scanning a document and generating image data corresponding to the scanned document to be transmitted;

a network interface device connected to a network and configured to transmit and receive facsimile data therebetween;

an advertisement information acquiring device configured to acquire advertisement information from an advertisement server connected to said data network via said network interface device;

a display device to display the advertisement information acquired from said advertisement information acquiring device;

a displaying control device;

a facsimile transmission mechanism configured to transmit by facsimile transmission the advertisement information in accordance with an instruction of transmitting by facsimile transmission the advertisement information displayed on the display device; and a specifying mechanism configured to specify a transmission destination country from a telephone number of a facsimile transmission address, wherein said displaying control device causes the advertisement information to be displayed when said document is being scanned and said image data is being accumulated, and wherein the facsimile transmission mechanism is configured to transmit by facsimile transmission the advertisement information of a language employed in the specified country.

* * * * *